United States Patent [19]
Elliott

[11] 3,812,505
[45] May 21, 1974

[54] SCANNING CAMERA

[75] Inventor: James B. Elliott, Hacienda Heights, Calif.

[73] Assignee: Unitek Corporation, Monrovia, Calif.

[22] Filed: Nov. 6, 1972

[21] Appl. No.: 303,994

[52] U.S. Cl. ............................................. 95/11 EM
[51] Int. Cl. .......................................... G03b 37/02
[58] Field of Search ........................................ 95/11

[56] References Cited
UNITED STATES PATENTS
3,382,781  5/1968  Hamilton ................................. 95/11
3,599,630  8/1971  Sato ........................................ 95/11

Primary Examiner—John M. Horan

[57] ABSTRACT

An improved scanning camera for periscopically photographing partially inaccessible objects. A slender viewing extension of the camera body is placed over the object, and a moving optical system in the body extension illuminates the object and transmits a line-scanned image of the object to a sheet of film. The camera is particularly useful for obtaining plan-view pictures of teeth in the upper and lower arches of a dental patient. The improvements described relate to an illumination and optical system, a scanning mechanism, and circuitry for controlling camera operation.

18 Claims, 14 Drawing Figures

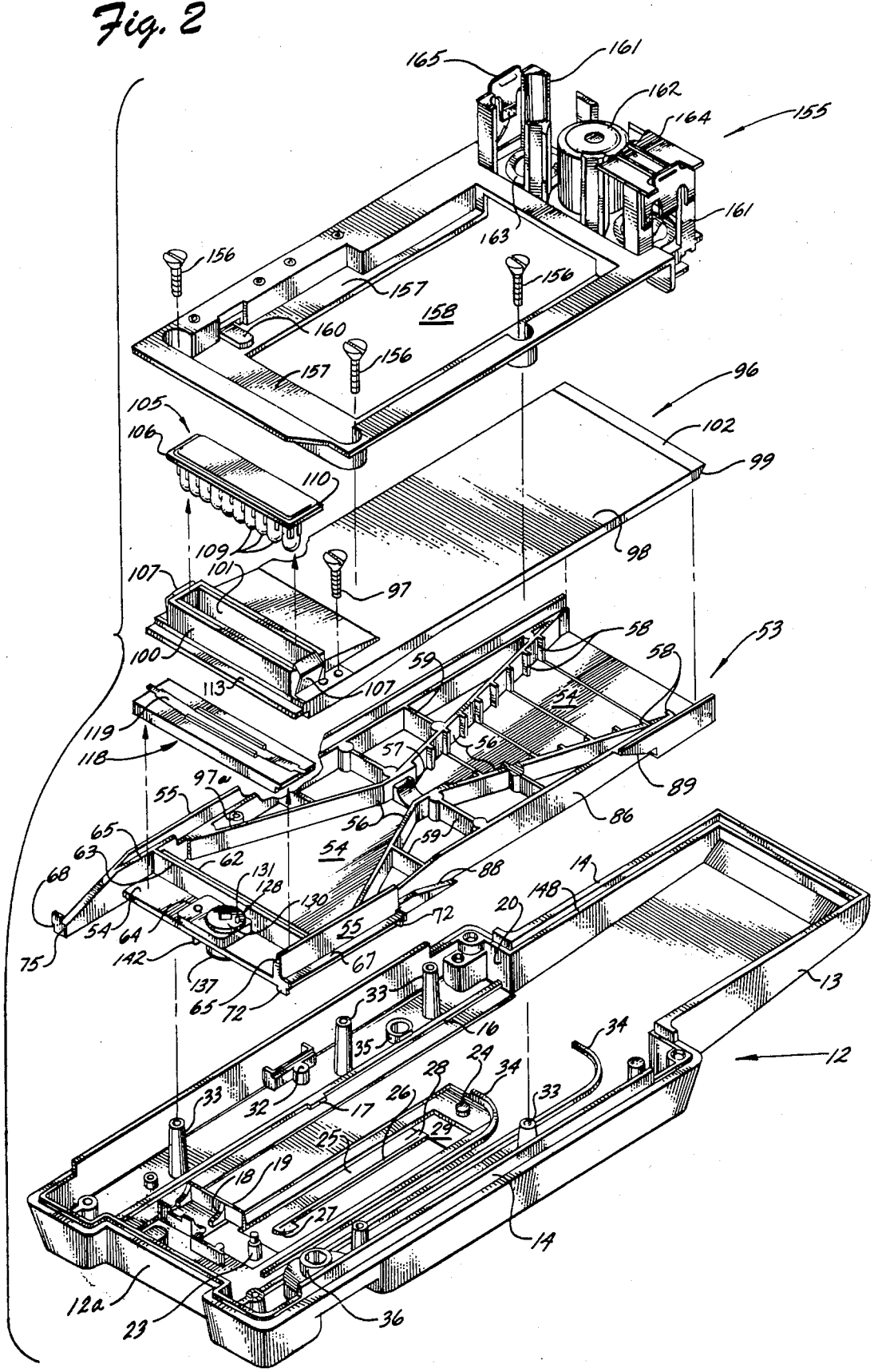

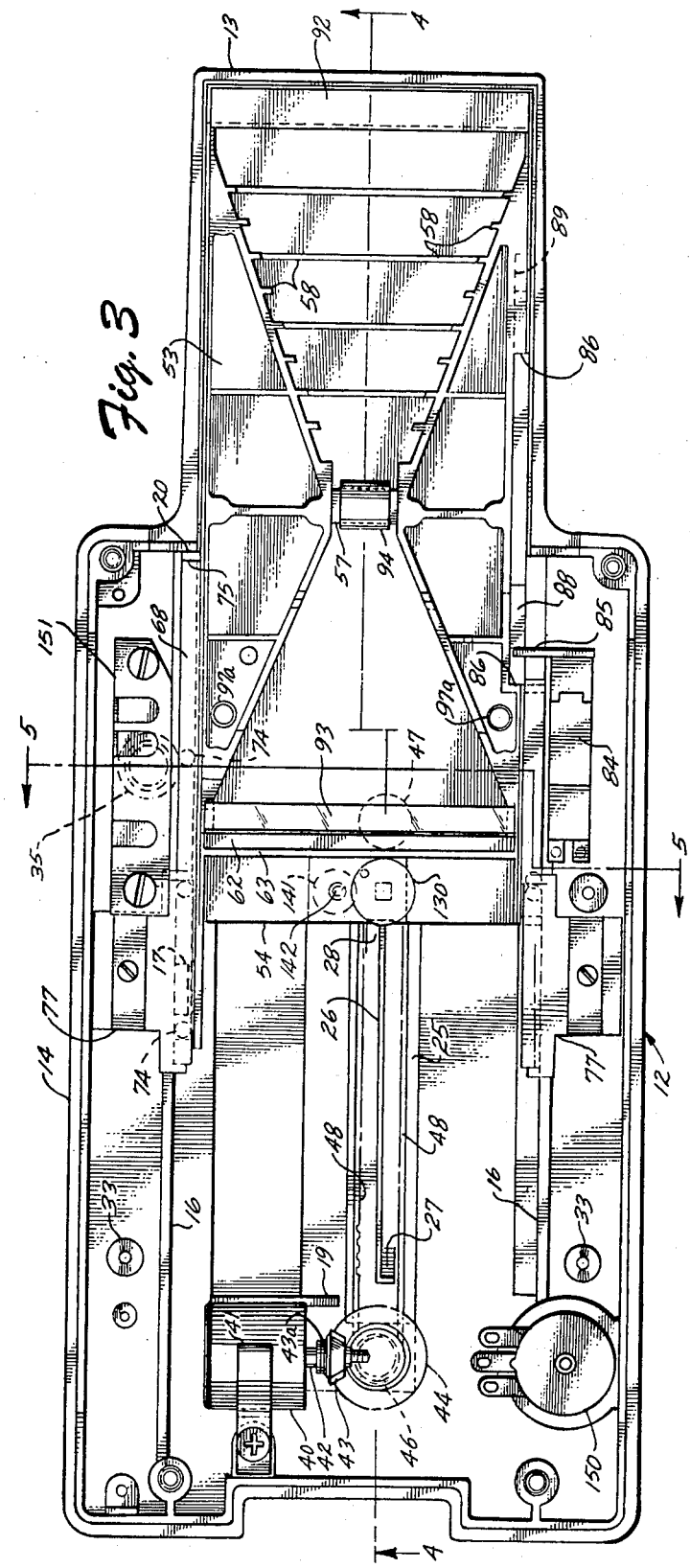
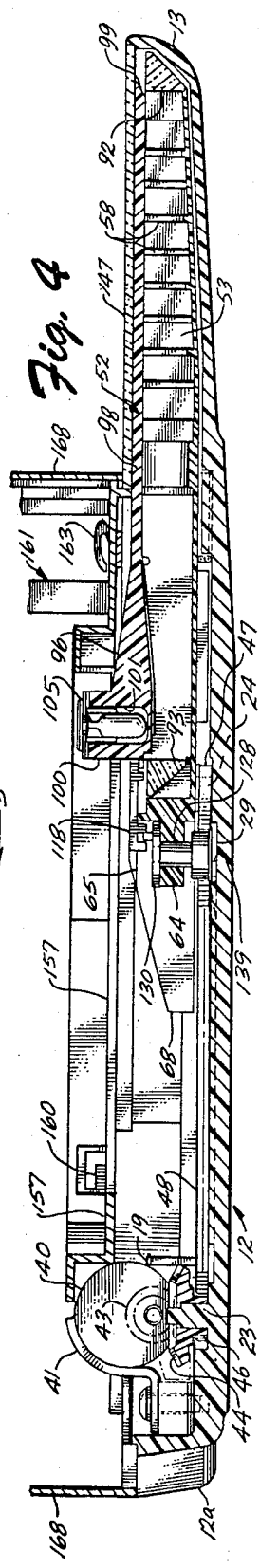
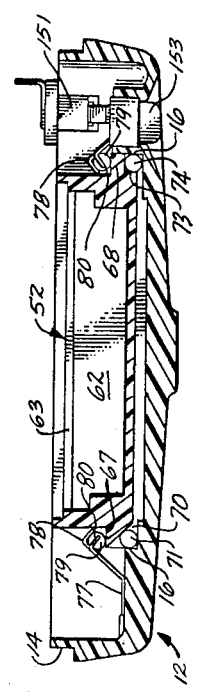
Fig. 3
Fig. 4
Fig. 5

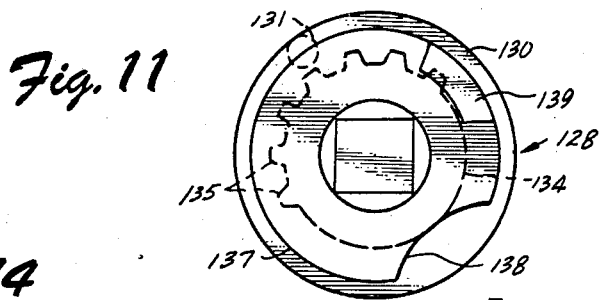
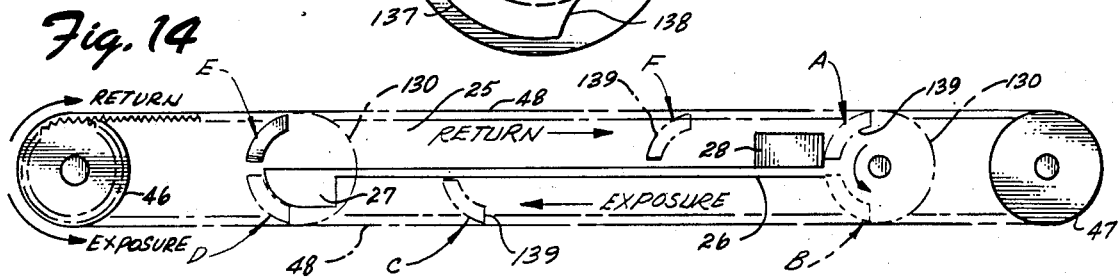
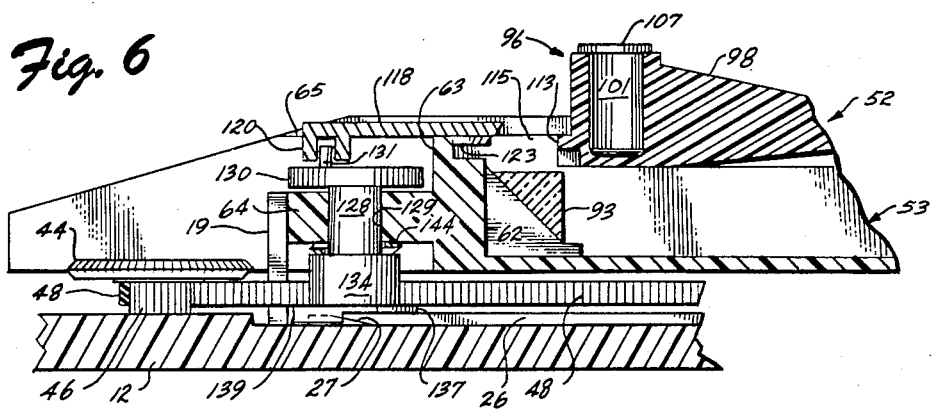
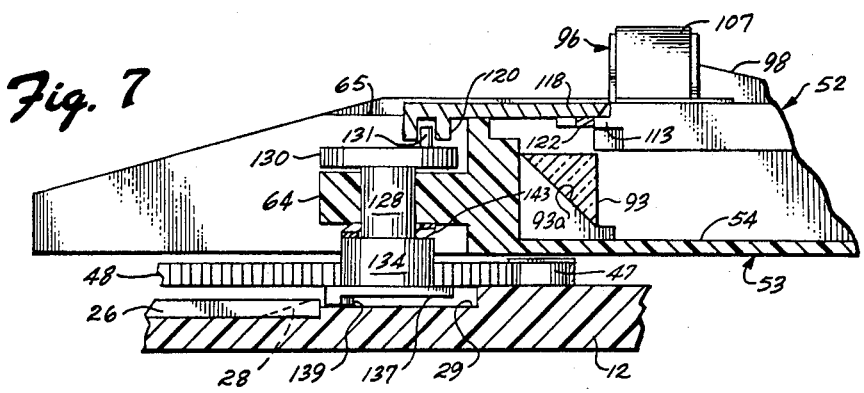

SCANNING CAMERA

BACKGROUND OF THE INVENTION

A scanning camera for photographing teeth and other relatively inaccessible objects is disclosed in U.S. Pat. No. 3,382,781 titled "Camera" and issued to William L. Hamilton on May 14, 1968. The camera described in this patent permits periscopic viewing of an object to be photographed. Image transmission to film is achieved by a line-scanning arrangement having a moving illumination and imaging system which scans a narrow rectangular beam of light over the object. As the scan progresses, an image of the illuminated zone is scanned across the surface of a photographic film which is spaced from but generally parallel to the surface being photographed. In dental applications, for example, the film and main camera body are outside the patient's mouth, and only a slender snout or housing extension need be inserted in the mouth.

The camera described in U.S. Pat. No. 3,382,781 has value in many applications apart from dentistry, and is useful in photographing any object which is partially hidden in a cavity or enclosure so a "straight on" view cannot be taken with a conventional camera. Utility in the field of dentistry is especially clear because the camera enables dentists to obtain plan-view pictures on an accurate one-to-one scale of occlusal or biting surfaces of an entire dental arch. Two photographs, each taken in a matter of seconds (and without patient discomfort, or any need for special photographic training), give the dentist a permanent record of all teeth in the upper and lower jaws. These pictures are especially useful to orthodontists in planning a treatment program and to record tooth movement as the program progresses.

The present invention relates to improvements in the basic design shown in U.S. Pat. No. 3,382,781. The new features result in a scanning camera which is easier to manufacture, operate and service, which has greater ruggedness and reliability, and which produces superior photographs due to an improved optical system having separate optical paths for the illuminating and imaging light beams.

SUMMARY OF INVENTION

Briefly stated this invention relates to a scanning camera adapted for periscopic photography of objects such as teeth, the occlusal surfaces of which are not accessible for direct viewing by a conventional camera. The camera includes a housing having a light-tight section for supporting a roll or pack of photographic film. A scanning assembly is movably mounted on the housing, and has an exposure portion within the light-tight section. An opposite end of the scanning assembly includes a viewing portion which is external to the light-tight section. A drive means is provided on the housing for moving the scanning assembly so the viewing portion is scanned over the object, and an image of the object is transmitted through the moving assembly to the exposure portion to be scanned over the film.

The scanning assembly includes optical means having first and second reflectors such as prisms mounted adjacent the viewing and exposure portions respectively for reflecting the image to the film. The scanning assembly further includes an illumination means having a light source spaced from the viewing portion toward the exposure portion, a means for conducting light from the source towards the viewing portion, and a reflector for redirecting light from the source toward the object. Preferably, the light-conducting means is a solid panel of a plastic light-conducting material, the panel having a reflective bevelled end for directing light from the source toward the object. An opposite end of the panel is enlarged and defines a cavity in which one or more lamps are positioned. The lamps are supported by a base releasably secured to the panel.

An important feature of the invention is to separate and isolate the paths traversed by the object-illuminating light and the image-forming light received from the object. This is accomplished by using the light-conductive panel to convey light to the object, and using a completely separate imaging system with a pair of reflectors and an intermediate lens to direct light received from the object to the film.

A shutter is mounted on the scanning assembly and is actuated by a sequencing means to admit light reflected from the object to the film during an exposure scan of the scanning assembly. The shutter is closed during a return scan of this assembly to avoid fogging of the film by ambient room light. The sequencing means preferably includes a shaft rotatably mounted on the scanning assembly, and having a crank connection to the shutter for linearly moving the shutter as the shaft is rotated. The shaft further preferably includes a lug which rides on ramps positioned on the housing at points defining the ends of the exposure and return scans. The ramp ends provide stops operative to prevent initiation of the next scanning mode of the scanning assembly until the shutter is actuated. A drive means, which preferably includes a reversible motor, is connected in driving relationship with the shaft and scanning assembly.

A circuit means includes batteries for operation of the motor and camera lamps, and further includes a limit switch for sensing the completion of the exposure and return scans to reverse the motor at these points, and to extinguish the lamps automatically at the end of the exposure scan. The circuitry includes means for adjusting lamp intensity and scan speed for films having different emulsion speeds. The scanning assembly is preferably mounted on the camera housing by a ball suspension having three balls which define a planar support.

BRIEF DESCRIPTION OF THE DRAWINGS

FIG. 2 is an exploded perspective view of a base, scanning assembly, and intermediate frame used in the camera;

FIG. 3 is a plan view of a carrier frame and drive mechanism mounted on the camera base;

FIG. 4 is a sectional elevation on line 4—4 of FIG. 3 with an illuminator added to the carrier frame, and showing fragments of the intermediate frame and a back assembly for the camera;

FIG. 5 is a sectional elevation on line 5—5 of FIG. 3 showing the mounting of the carrier frame on the camera base;

FIG. 6 is a sectional elevation of a portion of the scanning assembly and base, showing a shutter on the scanning assembly in an open position at the end of an exposure scan;

FIG. 7 is a view similar to FIG. 6, but showing the shutter in a closed position with the scanning assembly at the end of a return scan;

FIG. 11 is an enlarged bottom view of a sequencing shaft;

FIG. 14 is a schematic plan view of a sequencing-shaft lug and associated drive components, showing various positions of the lug as the camera scanning assembly is moved through an exposure scan and a return scan.

DESCRIPTION OF THE PREFERRED EMBODIMENT

Figure 1:
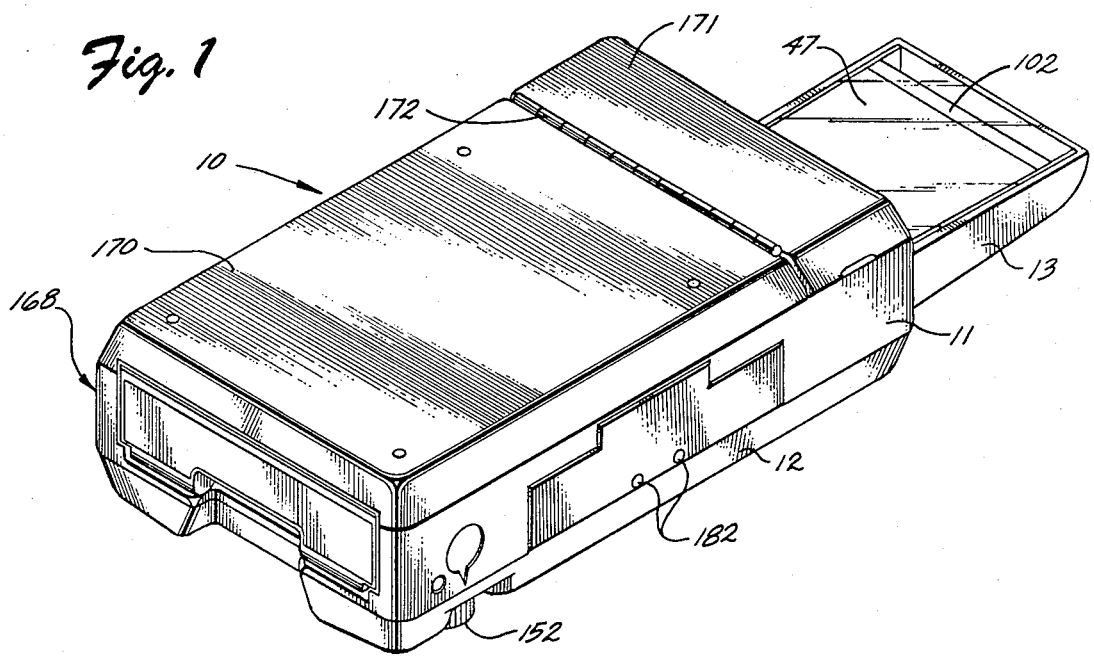
FIG. 1 is a perspective view of a scanning camera according to the invention.

FIG. 1 shows an overall view of a scanning camera 10 according to the invention. The camera is mounted in a housing 11 which includes a base 12 shown in detail in FIGS. 2–5. The base is generally rectangular in planform, but is narrowed at one end to define a mouthpiece or viewing extension 13. A continuous upright sidewall 14 extends around the periphery of the base.

A pair of upwardly extending, elongated guide tracks 16 are formed along opposite sides of the inner surface of base 12, and a central portion of one of the tracks is stepped inwardly to define a stop 17. A motor cradle 18 extends upwardly from the base between the tracks adjacent a first end 12a of the base. The cradle includes a wall 19 forming a retracted-position limit stop for a scanning assembly to be described below. An inwardly extending surface 20 of sidewall 14 adjacent the beginning of viewing extension 13 forms an extended-position limit stop for this scanning assembly.

A pair of longitudinally spaced shafts 23 and 24 extend perpendicularly from the base between tracks 16. The base surface between shafts 23 and 24 is downwardly stepped to define a channel 25 having an upstanding rib 26 along its center. A return ramp 27 extends from one side of the end of rib 26 closest to first end 12a of the base, and the ramp slopes upwardly toward end 12a from the floor of channel 25 to the top of rib 26. An oppositely sloping start ramp 28 is formed at the other end of rib 26, and extends laterally from the rib in a direction opposite to the return ramp. The floor of channel 25 is stepped slightly upwardly at the end of start ramp 28 to form a rectangular platform 29.

A pair of bracket support bosses 32 (only one of which is shown in FIG. 2) are formed on opposite sides of base 12 against sidewalls 14. A plurality of posts 33 extend from the base, and the posts are internally threaded to provide mounting bosses for components to be secured to the base. A pair of wiring ribs 34 (omitted in FIGS. 3–5 for clarity) on the base provide guidance for electrical wiring to be added to the camera, and the base also includes an operate-switch pushbutton boss 35 and a potentiometer boss 36. Base 12 is preferably an integrally molded unit which is formed to include all of the components thus far described.

Scanning camera 10 has a drive means which includes a motor 40 seated in cradle 18 and secured in place by a clamp 41. The motor is preferably a permanent-magnet D-C reversible unit having an off-center output shaft 42. A first bevel gear 43 is connected to the output shaft through a torque-limiting friction clutch 43a, and gear 43 meshes with a driven bevel gear 44 rotatably mounted on shaft 23. A belt-drive spur gear 46 is integrally formed beneath the teeth of bevel gear 44 and is coaxial therewith. A freely rotatable return roller 47 is fitted on shaft 24, and an internally toothed flexible belt 48 extends between the return roller and spur gear, the internal teeth of the belt being in driving engagement with the spur gear.

A scanning assembly 52 is movably mounted on base 12, and includes a carrier frame 53. The carrier frame has a base panel or floor 54 with upstanding sidewalls 55 along opposite edges thereof. A pair of converging-diverging walls 56 extend from floor 54 of the carrier frame between sidewalls 55, and walls 56 are connected at their centers by a lens supporting saddle 57. Walls 56 generally define the path of a bundle of light rays which are reflected from an object to be photographed, and transmitted to a photographic film as described below. A forward portion of floor 54 and the inner surfaces of walls 56 include a plurality of anti-reflection ribs 58 used to suppress stray light reflection within the camera. Integrally molded stiffening ribs 59 extend between walls 55 and 56 to rigidize the carrier frame.

The rear ends of converging-diverging walls 56 merge with sidewalls 55 short of the rear end of floor 54 of carrier frame 53, and an end wall 62 extends upwardly from the floor between sidewalls 55 intermediate the rear ends of walls 56 and the rear end of floor 54. A shutter stop rib 63 extends upwardly from the top of end wall 62. A sequencing-shaft support boss 64 extends upwardly from floor 54 between end wall 62 and the rear end of the floor. Each sidewall 55 is inwardly stepped adjacent the ends of end wall 62 to define a pair of shutter support ledges 65.

Carrier frame 53 is guided and supported within base 12 by a pair of longitudinally extending rails 67 and 68 which protrude from opposite sides of the carrier frame. Rail 67 is the shorter of the two rails, and need be only about one-half the length of the total displacement of the carrier frame within the housing. Rail 68 is about twice the length of short rail 67, and it extends rearwardly beyond the end of floor 54. As best seen in FIG. 5, rails 67 and 68 are fitted between and guided by tracks 16 on base 12.

The under surface of short rail 67 is inwardly bevelled (FIG. 5), and the space between this bevelled portion and adjacent track 16 forms a ball-receiving channel 70. A single spherical ball 71 (of the type used in ball bearings) is fitted into channel 70, and is held captive by end walls 72 at opposite ends of rail 67. Long rail 68 has an inwardly stepped undersurface which similarly forms a ball-receiving channel 73 between the rail and adjacent track 16. Channel 73 is divided into two portions by stop 17 on adjacent track 16, and a pair of balls 74 are fitted in channel 73 on opposite sides of stop 17 (FIG. 3). Balls 74 are held captive in their respective ends of channel 73 by a pair of end walls 75 formed on rail 68 at opposite ends of the channel.

Balls 71 and 74 form a three-point plane-defining support for carrier frame 53 between tracks 16 of the base. Wobble and misalignment of the carrier frame are prevented by using only three balls to form the planar support geometry. The bevelled undersurface of short rail 67 enables correction of any tracking errors (which might arise from slight dimensional variations in molded parts) by permitting a slight variation in the size of the ball used in channel 70.

The support structure of the carrier frame is completed by a pair of brackets 77 which are secured to bosses 32 at opposite sides of base 12. The brackets have inwardly extending portions forming inverted V-shaped channels 78 (FIG. 5) extending over the upper surfaces of rails 67 and 68. A single ball 79 is placed in the space between each V-shaped channel and the associated rail. Inwardly extending tabs 80 are formed on each bracket 77 at opposite ends of channel 78 to make ball 79 captive within the channel.

Short rail 67 is thus clamped between balls 71 and 79 and long rail 68 is similarly clamped between balls 74 and 79. The carrier frame is thereby constrained against motion perpendicular to floor 54, but is free to move longitudinally within base 12 under the guidance of the freely rolling balls.

The suspension system just described permits carrier frame 53 to reciprocate between fully extended and fully retracted positions within base 12. In the fully extended position, further motion of the carrier frame toward the end of viewing extension 13 is prevented when the forward end of long rail 68 abuts surface 20 of base 12 as shown in FIG. 3. The fully retracted position is defined when further motion of the carrier frame toward motor 40 is prevented by the rear end of floor 54 abutting wall 19.

A single-pole double-throw limit switch 84 (FIG. 3) is secured at one side of base 12 between sidewall 14 and carrier frame 53. The limit switch has an actuating pin 85 extending laterally therefrom. Sidewall 55 of the carrier frame has a cutaway portion 86 so the actuating pin can extend into the path traversed by the carrier frame.

An extended-position ramp or cam 88 is integrally formed in the side of carrier frame 53 beneath cutaway portion 86, and cam 88 is shaped to contact and lift actuating pin 85 just before the carrier frame reaches the fully extended position. An oppositely sloping retracted-position ramp or cam 89 is longitudinally spaced from cam 88 toward end wall 62, and this cam is shaped to contact and depress actuating pin 85 as the carrier frame approaches a fully retracted position. Limit switch 84 is of a bi-stable two-position type with a snap action which toggles the switch into one of two stable positions depending on which cam contacts actuating pin 85.

Optical components carried by carrier frame 53 include first and second 45°–45°–90°– prisms 92 and 93 (FIGS. 3, 4 and 12) which serve to deflect light beams reflected from the object through an angle of 90°. First prism 92 is cemented in place at the viewing-extension end of carrier frame 53, and is oriented to receive light beams directed substantially perpendicularly to base 12, and to redirect these light beams substantially parallel to floor 54 of the carrier frame toward lens-supporting saddle 57. Second prism 93 is cemented against sloping ledges 93a (FIG. 7) on sidewalls 55 of the carrier frame adjacent wall 62, and is oriented to redirect incident light beams through a 90° angle so they are again substantially perpendicular to floor 54 of the carrier frame. Mirrors can be substituted for the prisms if desired.

A photographic lens 94 is cemented to lens-supporting saddle 57 of the carrier frame between the two prisms. This lens is of a conventional three-element convexo-convex type and is selected to provide an image size which is compatible with the size of film selected for use in the camera. Additional details on design of this lens are set forth in the aforementioned U.S. Pat. No. 3,382,781.

A modular illuminator 96 is secured over and serves as an upper closure wall for carrier frame 53. The illuminator is held in place by a pair of metal screws 97 threaded into bosses 97a (having internal metal sleeves to be electrically conductive) on the carrier frame. Illuminator 96 includes a light guide 98 shaped as a thin, generally rectangular panel and formed from a light-transmitting acrylic plastic such as sold under the trademark "Plexiglas." This material has the property of acting as a "light pipe" which conducts light from a source to a remote zone to be illuminated.

Figure 12:
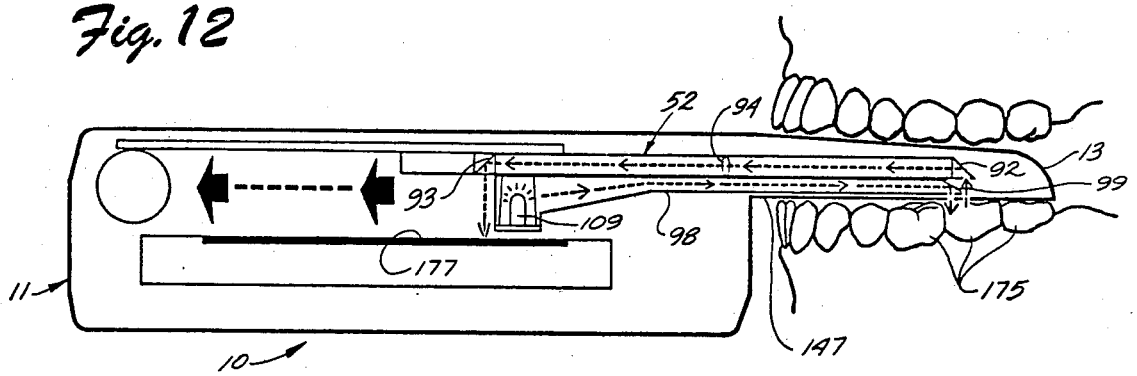
FIG. 12 is a schematic view showing how the camera is used to photograph teeth.

An end 99 of light guide 98 is beveled at an angle of about 36°, and is positioned adjacent first prism 92. The outer surface of the beveled portion is covered with a reflective film which is preferably aluminum deposited by a vacuum-metallizing process. This reflective film acts as a mirror which redirects light reaching the beveled end toward the object to be photographed. As shown in FIGS. 4 and 12, prism 92 extends slightly beyond the beveled end of the light guide in order to receive light emitted by the light guide and reflected by the object.

An opposite end of light guide 98 is enlarged to form a hollow housing 100 defining a rectangular cavity 101. The outer surfaces of the enlarged end of the light guide, including housing 100 are also vacuum metallized with an aluminum film as described above. This film insures maximum light transmission from the cavity through the thin panel portion of light guide 98 toward beveled end 99.

After the light guide has been metallized, most of the outer surface of the unit is made opaque (by, for example, enclosing the surface in an envelope of light-blocking material such as a shrinkable opaque plastic sleeve) to prevent transmission of stray light within the camera. A thin rectangular section 102 at end 99 (FIG. 2) is left uncovered and acts as an exit window for light transmitted through the thin rectangular panel and reflected from the aluminized beveled portion at the end of the light guide.

Figure 8:
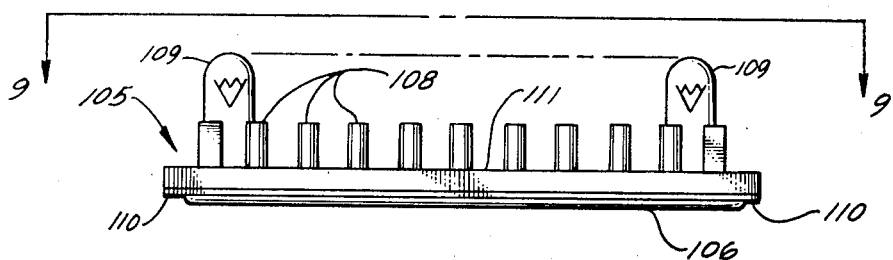
FIG. 8 is an enlarged elevation of a lamp module.
Figure 9:
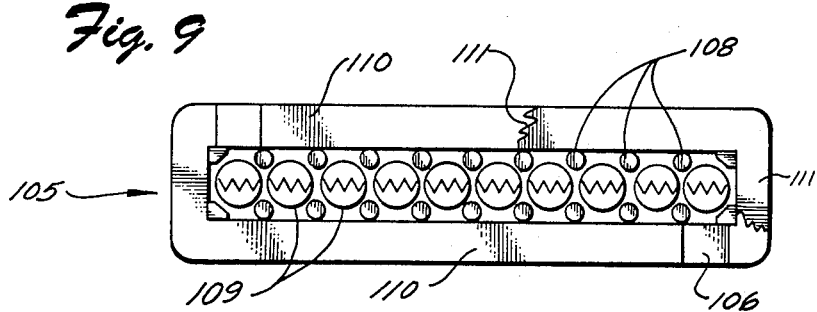
FIG. 9 is a top view of the lamp module, partly broken away and on line 9—9 of FIG. 8.

Illuminator 96 also includes a lamp module 105 (FIGS. 2, 8 and 9) having a base 106 which fits against the top of hollow housing 100 on the illuminator. The base is held in place by a pair of spring clips 107 secured to light guide 98 at opposite ends of housing 100. A plurality of mounting posts 108 extend from base 106 and a plurality of miniature electric lamps 109 are positioned by and seated between the mounting posts.

Preferably, lamps 109 are T 1¼ series or a similar subminiature type, and a General Electric type 2139-D is a suitable choice. These lamps are baseless units having a pair of pigtail leads extending therefrom. In assembling lamp module 105, the lamp leads are soldered or spot welded to a pair of metal strips 110 secured to base 106. These strips terminate at opposite ends of the base to be in electrical contact with metal clips 107.

The lamps are electrically connected in parallel by this arrangement so each lamp receives the same voltage, and burn out of one lamp does not affect operation of the other lamps. The undersurface of the base and conductive strips is covered by a light-seal gasket 111 extending around the lamps.

Lamps 109 are connected to batteries and other stationary circuit components in the camera through conductive strips 110, clips 107, and screws 97 which are threaded into conductive sleeves in bosses 97a. These sleeves extend through carrier frame 53 for connection to a pair of flexible wires (not shown) secured to fixed terminals on the base and extending between wiring ribs 34 to a clearance space between the base and the undersurface of the carrier frame. The wires flex during camera operation to follow the movement of the scanning assembly, but the wires are held in a proper position by ribs 34.

A shutter ledge 113 is integrally formed with and extends longitudinally from light guide 98 adjacent to the base of hollow housing 100. As shown in FIG. 6, illuminator 96 is positioned on carrier frame 53 so shutter ledge 113 is spaced from end wall 62, leaving a rectangular opening or exposure window 115 in the upper surface of scanning assembly 52 above second prism 93.

Figure 10:
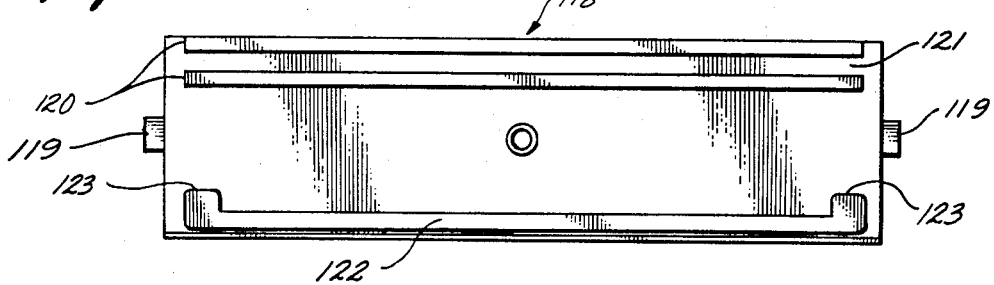
FIG. 10 is an enlarged bottom view of a shutter.

Scanning assembly 52 further includes a rectangular closure panel or shutter 118 (FIGS. 2 and 10) slidably mounted on carrier frame 53 between sidewalls 55 over end wall 62, and supported at its opposite ends by ledges 65. A leaf spring 119 is secured to the top of shutter 118 and the spring has ends which extend slightly beyond the ends of the shutter.

The undersurface of shutter 118 includes a pair of closely spaced elongated ribs 120 defining a crank-pin channel 121 therebetween. A shutter stop rib 122 is formed parallel to ribs 120 adjacent the opposite edge of shutter 118, and the stop rib has enlarged ends 123 extending slightly toward ribs 120.

Shutter 118 is free to slide within a limited range along shutter support ledges 65 between a closed position and an open position. In the closed position as shown in FIG. 7, the shutter extends over and covers exposure window 115, and the edge of stop rib 122 abuts the end of shutter ledge 113 on illuminator 96. In the open position as shown in FIG. 6, the shutter is retracted away from exposure window 115 to a position in which enlarged ends 123 on shutter rib 122 abut shutter stop rib 63 on end wall 62 of the carrier frame.

Scanning assembly 52 also includes a sequencing shaft 128 (FIGS. 2–4, 6–7 and 11) which cooperates with flexible belt 48 to drive shutter 118 between the open and closed positions, and to reciprocate the entire scanning assembly between extended and retracted positions during operation of the camera. Sequencing shaft 128 is journalled through a bore 129 in support boss 64 at the end of carrier frame 53. A crank disk 130 is rigidly secured to the upper end of shaft 128, and the disk rests on the upper surface of support boss 64. An integrally molded crank pin 131 is radially spaced from shaft 128 and extends upwardly from the top of disk 130 to seat in crank-pin channel 121 between ribs 120 on the undersurface of shutter 118.

Sequencing shaft 128 is enlarged in diameter adjacent its lower end to form a drum 134. Spur-gear teeth 135 extend around about one-half (slightly less than 180°) of the drum periphery. The drum thus defines a partial gear on one side, and a smooth surface on the other side. During reciprocation of the scanning assembly, the toothed inner surface of one leg of looped belt 48 engages the partial gear, and the inner surface of the other belt leg slides over the smooth portion of the drum.

A thin circular flange 137 is integrally formed at the bottom of drum 134, and has a diameter slightly larger than the outside diameter of spur-gear teeth 135. A moon-shaped cut 138 is formed in flange 137, and is used only to simplify assembly of the sequencing shaft and carrier frame. A sequencing lug 139, shaped as an annular sector, extends downwardly from an edge of flange 137 and is centered beneath one end of the partial gear 135.

Teeth 135 on the sequencing-shaft drum engage the teeth on the innersurface of flexible belt 48. The belt and drum teeth are maintained in engagement by a freely rotating idler roller 141 mounted on a shaft 142 secured to and extending downwardly from boss 64. A clearance space 143 exists between the top of drum 134 and the undersurface of boss 64, giving the sequencing shaft a limited range of axial freedom.

A spring washer 144 is fitted around the sequencing shaft in clearance space 143, and the spring washer urges the sequencing shaft downwardly to position the undersurface of crank disk 130 against the top of boss 64. As will be explained in greater detail below, circular flange 137 of the sequencing shaft rides along rib 26 on base 12, and sequencing lug 139 moves along alternate sides of rib 26 as the scanning assembly is reciprocated through a picture-taking cycle.

A transparent glass window 147 is fitted against a ledge 148 in viewing extension 13 of base 12, and the window covers the open face of the viewing extension. Assembly of the portion of the scanning camera thus far described is completed by the addition of a motor speed-control potentiometer 150 (FIG. 3) mounted on boss 36 of base 12, and a single-pole double-throw operate switch 151 mounted on posts 33 over pushbutton boss 35 of the base. A shaft of potentiometer 150 extends through a bore in the base, and is secured to a speed-control knob 152 (FIG. 1) on the outside of the camera housing. A pushbutton 153 to actuate operate switch 151 is fitted through a bore in boss 35 to be accessible from the outside of the camera.

An intermediate frame 155 (FIG. 2) is fitted over scanning assembly 52 and a portion of base 12 between viewing extension 13 and motor 40. The intermediate frame is generally rectangular, and is secured in place by screws 156 threaded into posts 33 and other mounting holes on the frame. The intermediate frame is recessed to define a central panel 157 having a rectangular window 158 therethrough. An image of the object being photographed is transmitted by the scanning assembly to be directed through this window to photographic film positioned adjacent the intermediate frame as described below. The undersurface of panel 157 along the sides of window 158 bears on leaf spring 119, maintaining shutter 118 in proper position when the scanning assembly is reciprocated.

A double-pole double-throw slide switch 160 is mounted at one side of intermediate frame 155, and various diodes and other components (not shown) used in the electrical circuitry of the camera are mounted beneath the intermediate frame adjacent the switch. A battery holder assembly 161 is mounted at an end of the intermediate frame adjacent viewing extension 13, and the assembly accommodates three tubular batteries 162. In a typical form, each battery 162 comprises three nickel-cadmium cells each supplying 1.35 volts at no load. These cells are preferably of a heavy-duty rechargeable type.

The lower end of each battery 162 rests on a contact ring 163 secured to intermediate frame 155, and the batteries are held in place by an upper clamping plate 164 releasably secured between a pair of spring clips 165 on the battery-holder assembly. Electrical contact with batteries 162 is made by contact rings 163 and a set of contacts (not shown) on the undersurface of upper clamping plate 164, the clamping-plate contacts in turn making contact with spring clips 165 which are interconnected with other electrical circuitry in the camera.

Housing 11 of scanning camera 10 is completed by a back assembly 168 (FIG. 1) which covers the open face of base 12 and extends over intermediate frame 155 and scanning assembly 52. The back assembly holds film for the camera, and includes a main film-access door 170 and a smaller battery-access door 171 mounted on a common hinge 172.

As explained in the aforementioned U.S. Pat No. 3,382,781, a number of different styles of camera backs may be used, depending upon the type of film selected for the camera. In a presently preferred form, back assembly 168 is of a style made by Polaroid Corporation to accommodate either color or black-and-white Polaroid film. In this form, the back is substantially a commercially available item with only minor modifications being necessary to adapt the back to fit mechanically with base 12. Other styles of backs can be used with the scanning camera if roll film, for example, is to be used.

Back assembly 168 fits snugly against base 12 to make the film compartment of the housing a light-tight enclosure. The only opening in this enclosure is the clearance space provided for the scanning assembly to extend into viewing extension 13. The back assembly and intermediate frame 155 are configured to prevent stray light from passing through this clearance space. The scanning assembly thus has an exposure portion within the housing to project image-forming light to the film, and a viewing portion external to the light-tight enclosure for illuminating the object and receiving reflected light to be transmitted into the enclosure.

Operation of the camera is illustrated schematically in FIG. 12 which shows viewing extension 13 inserted in a patient's mouth with viewing window 147 resting against teeth 175 of the lower jaw. If desired, a transparent sanitary sleeve (not shown, but of the style described in U.S. Pat. No. 3,382,781) may be fitted over the viewing extension before inserting the camera in the mouth.

Operate switch 151 is depressed by the camera operator to drive the scanning assembly through its cycle. Upon depression of the operate switch, lamps 109 are illuminated and light is transmitted through light guide 98 of illuminator 96 to be reflected downwardly from the beveled end of the light guide toward the occlusal surfaces of teeth 175. Light reflected from the teeth impinges on first prism 92 and is deviated through 90° to pass through lens 94 to second prism 93. The image is then deflected downwardly to pass through exposure window 115 to impinge on film 177 carried by back assembly 168.

After the lamps are illuminated, scanning assembly 52 is smoothly retracted toward motor 40, transmitting a rectangular line-scanned image of the teeth across film 177. When the scanning assembly reaches the fully retracted position, an image of the entire lower dental arch has been photographed, and lamps 109 are extinguished. The edges of panel 157 around window 158 act as a mask which provides an unexposed border on film 177.

The cycle is completed by releasing operate switch 151 whereupon shutter 118 is closed to cover exposure window 115, and scanning assembly 52 is returned to the fully extended position in readiness for taking another photograph. Teeth in the upper dental arch are photographed simply by inverting the camera.

Figure 13:
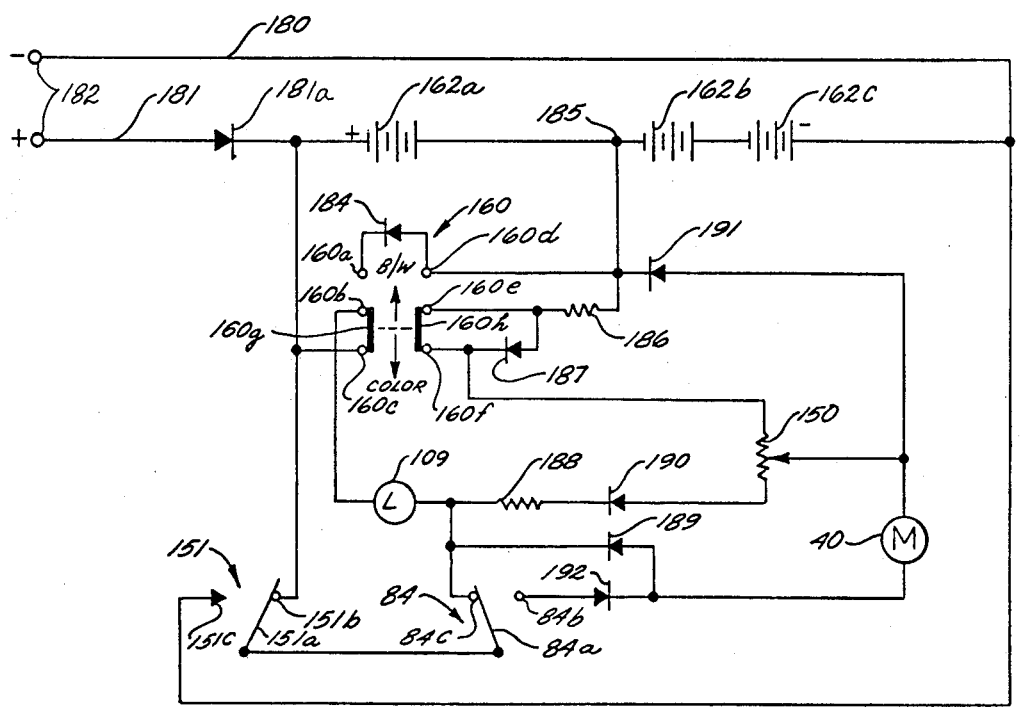
FIG. 13 is a wiring diagram of circuitry used in the camera.

Referring to the schematic wiring diagram in FIG. 13, the camera circuitry includes three series-connected batteries 162a, 162b and 162c. A pair of leads 180 and 181 are connected to opposite ends of the series-connected batteries, and to a pair of external contacts 182 (FIG. 1) on the camera housing for connection to an external battery charging circuit. Lead 181 includes a series-connected diode 181a to protect the batteries and circuitry against accidental shorting of external contacts 182.

Single-pole double-throw operate switch 151 includes a movable contact 151a which is normally closed against a fixed contact 151b. Actuation of this spring-loaded switch by pushbutton 153 transfers movable contact 151a to a second fixed contact 151c. Contact 151b is connected to the positive terminal of the three series-connected batteries, and contact 151c is connected to the negative terminal of these batteries.

Single-pole double-throw limit switch 84 has a movable contact 84a and a pair of fixed contacts 84b and 84c. Movable contact 84a is connected to movable contact 151a of the operate switch. Limit switch 84 is shown with movable contact 84a connected to fixed contact 84c which is the position of the switch when the camera is in the fully extended position ready to take a picture. Switch 84 is actuated by cams 88 and 89 when scanning assembly 52 is reciprocated between its extended and retracted positions during a picture-taking cycle.

Slide switch 160 is a double-pole double-throw switch having fixed contacts 160a–f and sliding contacts 160g and 160h. The function of this switch is to adjust the camera for use with either black-and-white or color film. In the color position, sliding contact 160g connects fixed contacts 160b and 160c, and sliding contact 160h connects fixed contacts 160e and 160f. In the black-and-white position, sliding contact 160g connects fixed contacts 160a and 160b, and sliding contact 160h connects fixed contacts 160d and 160e.

Contact 160a of the slide switch is connected to the cathode of a diode 184, the anode of which is connected to contact 160d. The latter contact is in turn connected to a partial-voltage terminal 185 at the junction of series-connected batteries 162a and 162b. Contact 160c is connected to fixed contact 151b of the operate switch. Contact 160e is connected through a resistor 186 (typically 15 ohms) to terminal 185, and contact 160e is also connected to the anode of a diode 187 having its cathode connected to fixed contact 160f.

Contact 160b of the slide switch is connected to one side of paralleled lamps 109, the other side of which is connected to a resistor 188 (typically 6.8 ohms), the cathode of a diode 189, and to fixed contact 84c of the limit switch. The other end of resistor 188 is connected to the cathode of another diode 190 having an anode connected to one end of potentiometer 150 (typically 5 ohms). The other end of potentiometer 150 is connected to contact 160f of the slide switch, and the arm of the potentiometer is connected to the anode of a diode 191 having its cathode connected to terminal 185. The potentiometer arm is also connected to one side of motor 40, the other side of which is connected to the anode of diode 189 and the cathode of another diode 192. The anode of diode 192 is connected to terminal 84b of the limit switch.

The switch positions shown in FIG. 13 place the camera in readiness for taking a color photograph. To initiate the exposure portion of the camera operating cycle, operate switch 151 is depressed to place moving contact 151a against fixed contact 151c. Current then flows from the positive terminal of series-connected batteries 162a–c through contacts 160c, g, and b to lamps 109. The lamp current is returned to the negative side of the three batteries through contacts 84a and c, and contacts 151a and 151c. Lamps 109 are thus operated at the full voltage available from series-connected batteries 162 to provide maximum light to the relatively slow color film.

When operate switch 151 is actuated, current also flows to motor 40 from batteries 162b and c only. The full voltage of the three stacked batteries is not required for motor operation in this mode, and accordingly only two of the three available batteries are used. The path of current flow is from the positive terminal of battery 162 through resistor 186 and switch contacts 160e, h and f to potentiometer 150. Current then flows through the arm of the potentiometer to the motor, and thereafter through diode 189 to return to the negative side of battery 162c through switch contacts 84a and c, and 151a and c. Current flowing through potentiometer 150 and not diverted to motor 40 is returned to the negative side of the battery through the same switch contacts after passing through diode 190 and resistor 188.

Potentiometer 150 is a speed control for the motor, and permits the user to vary the scanning speed of scanning assembly 52, and hence the effective exposure time. This allows the user to adjust the camera for use with different types of photographic films, and also to compensate for aging of lamps 109. A reduced scanning speed is desired for the relatively slow emulsion speed of color film, and resistor 186 is connected in series with the d-c motor when switch 160 is in the color position to provide the desired voltage drop. Diode 190 is a blocking diode, and resistor 188 is in series connection with potentiometer 150 to insure that adequate voltage is available to operate the motor even though potentiometer 150 is set for minimum motor speed.

Operate switch 151 is held in the depressed position throughout the exposure stroke. Operation of the lamps and motor is automatically terminated at the end of the exposure stroke when limit switch contact 84a is transferred from contact 84c to contact 84b by the action of retracted-position cam 89 on actuating pin 85.

Termination of the exposure stroke is easily sensed by the user, and the operate switch is then released to return movable contact 151a to fixed contact 151b. This initiates the return stroke of the scanning-assembly cycle, and current flows from the positive terminal of battery 162a through contacts 151b, 151a, 84a, 84b, diode 192, motor 40 and diode 191 to the negative side of battery 162a.

Current flow through the motor is reversed (as compared to current flow during the exposure stroke) during the return stroke of the scanning assembly, and the direction of rotation of the motor is accordingly reversed. Battery 162a alone is sufficient to provide the relatively low voltage needed for the motor during the return stroke, and batteries 162b and c are not active in the circuit during this part of the operation cycle. Lamps 109 are also extinguished during the return stroke, due to the position of the limit switch 84 and the functioning of the blocking diodes in the lamp circuit.

When black-and-white film is used in the camera, a lower illumination level and faster scan speed is normally desired due to the faster emulsion speed of this film. Slide switch 160 is accordingly positioned to place sliding contact 160g across fixed contacts 160a and b, and sliding contact 160h across fixed contacts 160d and e. In this position, current for lamps 109 flows from the positive terminal of series-connected batteries 162b and c through contact 160d, diode 184, contacts 160a, 160g, and 160b, through the lamps to contacts 84c, 84a, 151a and 151c, and finally to the negative terminal of battery 162c.

The desired reduction in lamp voltage is provided by using only two of the three series-connected batteries, and by the voltage drop across diode 184. This diode has no blocking function in the circuit, and is used only to provide a constant voltage drop (of about 0.7 volts) during lamp operation. Use of a diode is preferred to provide a constant voltage drop, rather than the variable voltage drop which would occur if a resistor was used. The variable voltage drop across a fixed resistor is undesirable, because the in-rush current to the lamps is quite high, and the lamps would be slow in reaching full intensity due to the significant voltage drop across a fixed resistor during initiation of lamp operation.

Motor current during operation with black-and-white film flows from the positive terminal of battery 162b through contacts 160d, h and e, diode 187, and potentiometer 150. A portion of the current reaching potentiometer 150 is diverted through the potentiometer arm to motor 40, and thereafter returns to the negative side of battery 162c through diode 189, contacts 84c and 84a, and contacts 151a and 151c. This current path is generally similar to that of the color-film mode, except that resistor 186 is not in circuit, and accordingly a higher operating voltage is delivered to the motor. The return-scan operation is identical to that described above, and is initiated when limit switch 84 is toggled by retracted-position cam 89, and the operate switch is released.

This circuit is simple and inexpensive to construct, and provides semi-automatic control of the motor and lamps, simple compensation for either black-and-white or color-film, and a range of adjustment of motor speed to compensate for lamp aging and different film types. The use of diode logic simplifies the number and types of switches required. Power demands are relatively evenly shared by the three batteries, maximizing the life of each individual battery.

The mechanical functioning of sequencing shaft 128 in controlling the movement of scanning assembly 52 and shutter 118 will now be described. This operation is best understood by considering six separate operating modes of the sequencing shaft as it is driven by motor 40 and flexible belt 48. The relative positions of sequencing-shaft lug 139 in channel 25 are illustrated for all six modes in FIG. 14. The open position of shutter 118 at the end of an exposure scan is shown in FIG. 6, and the closed shutter at the end of a return scan is shown in FIG. 7.

In a first "ready for exposure" mode, sequencing-shaft lug 139 rests at the base of the abrupt end of start ramp 28 (FIG. 7 and position A in FIG. 14) and shutter 118 is in the closed position with stop rib 122 abutting shutter ledge 113 on illuminator 96. Operate switch 151 is then depressed to activate motor 40 as described above, and the current flow through the motor is such that flexible belt 48 is driven in a counterclockwise direction as seen in FIG. 14. The internal teeth on the flexible belt are engaged with the partial gear formed by teeth 135 on drum 134 of the sequencing shaft, and the shaft must either rotate or translate in response to the motion of the flexible belt.

Translation is prevented by lug 139, the radially outer surface of which abuts the end of start ramp 28 in position A, so the sequencing shaft rotates counterclockwise to move lug 139 to position B in FIG. 14. This rotary movement causes crank pin 131 to retract shutter 118 to the position shown in FIG. 6, opening exposure window 115 so an image from the object being photographed can be transmitted to film 177 after an exposure scan is commenced. When lug 139 reaches position B, further rotation of the sequencing shaft is prevented by enlarged ends 123 of stop rib 122 which abuts rib 63 on end wall 62 to block further shutter translation and movement of crank pin 131.

When lug 139 reaches position B, lamps 109 are up to full brilliance, and the scanning assembly is free to translate because the lug has cleared the end of start ramp 28 and rib 26. Continued counterclockwise motion of the drive belt therefore carries the sequencing shaft and scanning assembly to the left (as viewed in FIG. 14) to commence the exposure scan.

At the beginning of the exposure scan, lug 139 rests on platform 29, positioning flange 137 slightly higher than the top of rib 26 to insure that the flange will move without interference over the top of the rib. During an early part of the exposure scan, lug 139 slides off platform 29, and the sequencing shaft is thereafter supported by flange 137 resting on and sliding along the top of rib 26, the undersurface of lug 139 now being slightly above the floor of channel 25. This arrangement minimizes frictional drag of the scanning assembly, and reduces motor load and current drain from the camera batteries.

As the exposure scan continues, lug 139 moves steadily to the left as illustrated by position C in FIG. 14. As the end of the exposure scan is approached, the lug rides up the sloping surface of return ramp 27, and finally drops off the abrupt end of the return ramp to the position shown in FIG. 6 and in position D of FIG. 14. At this point, retracted-position cam 89 has moved actuating pin 85 to position limit switch 84 in the "return" position with movable contact 84a against fixed contact 84b. Motor operation is thus terminated, and the lamps are extinguished by the actuation of the limit switch. Axial movement of the sequencing-shaft which is required to permit lug 139 to ride up return ramp 27 is provided by spring washer 144 which compresses in clearance space 143, allowing the sequencing shaft to shift upwardly within support boss 64 of carrier frame 53.

Overtravel of the scanning assembly beyond position D is prevented because the rear ends of floor 54 and support boss 64 of carrier frame 53 abut wall 19 when the scanning assembly is in this position (FIG. 6). Any remaining energy in the moving parts of the system (such as the momentum of the scanning assembly, and the rotational energy of the motor which takes a finite time to wind down after actuation of the limit switch) is absorbed by friction clutch 43a. Exposure window 115 passes beneath panel 157 of the intermediate frame shortly before actuation of the limit switch and the dropping of lug 139 from return ramp 27, so exposure of the film is complete prior to termination of the mechanical exposure-scan cycle.

The end of the exposure scan is easily sensed by the camera user by the slight impact of the scanning assembly against wall 19, and also by the termination of motor noise. The user then initiates the return scan by releasing operate switch 151 to reposition movable contact 151b against contact 151a. Motor 40 is then operated in a reverse direction to drive flexible belt 48 in a clockwise direction as seen in FIG. 14. This clockwise motion of the flexible belt requires that the sequencing shaft either translate to the right, or rotate in a clockwise direction.

Translation is prevented because the curved inner surface of lug 139 abuts the abrupt curved end of return ramp 27 (FIG. 6, and position D of FIG. 14). The sequencing shaft therefore rotates clockwise to position E in FIG. 14. This motion in turn causes crank-pin 131 to drive shutter 118 back to a closed position as shown in FIG. 7. Further rotation of the sequencing shaft beyond the closed-shutter position is prevented because shutter stop 122 abuts shutter ledge 113 on illuminator 96, and crank-pin 131 is blocked by ribs 120 which form the crank-pin channel.

With the shutter closed and the sequencing shaft locked against further rotation, continued clockwise movement of flexible belt 48 translates the sequencing shaft and scanning assembly to the right in FIG. 14 through a return scan as suggested in position F. During the return scan, the shutter remains closed to prevent any stray light from reaching the film. As the end of the return scan is approached, lug 139 rides up the sloping surface of start ramp 28, and finally drops off the end of the ramp into position A.

As position A is reached, extended-position cam 88 contacts actuating pin 85 to drive limit switch 84 back to the "exposure" position with movable contact 84a against fixed contact 84c. This terminates operation of the motor, and further movement of the scanning assembly to the right is prevented when the front end of long rail 68 abuts surface 20 of the camera housing (FIG. 3). Any remaining energy in the moving parts of the system is dissipated in the motor clutch as explained above. The operating cycle in the camera is now complete, and the camera is in readiness for initiation of another picture-taking cycle. The exposed film is removed if a Polaroid film pack is in use, or the film is advanced if a roll-film back is selected.

Throughout the exposure and return scans, the internal teeth on the upper leg (as viewed in FIG. 14) of flexible belt 48 are always engaged with teeth 135 forming the partial spur gear on drum 134 of sequencing shaft 128. Due to the limited rotation of the sequencing shaft during shutter operation, teeth 135 never engage the internal teeth on the lower leg of the belt, and the lower leg slides easily over the smooth toothless portion of drum 134. This prevents binding of the drum and lower belt leg which move together during shutter actuation, but move in opposite directions during linear translation of the scanning assembly.

Preferably, the major components of the scanning camera are molded from plastic materials for economy and strength. A glass-filled polycarbonate plastic (such as sold under the trademark "Lexan") is suitable for the larger components such as base 12, carrier frame 53, and intermediate frame 155. Back assembly 168 can also be made from this material, but is preferably obtained from Polaroid Corporation as a complete subassembly if Polaroid film is to be used in the camera. Sequencing shaft 128 is preferably molded from nylon plastic having a molybdenum-sulfide filler for minimum friction. All of these components are molded from black plastic to minimize stray reflections within the camera interior.

The scanning camera of this invention is intended for the same applications as described in the aforementioned U.S. Pat. No. 3,382,781. The new camera, however, incorporates a number of design improvements which may be summarized as follows:

1. Image quality and utilization of light available from the camera lamps is substantially improved by separating the optical paths traversed by light illuminating the object, and light reflected from the object to the film. This is achieved by using the light-pipe effect of light guide 98 to illuminate the object, and then receiving the reflected light beams in a separate optical system which includes the lens and two prisms carried by the scanning assembly. This arrangement also insures more uniform distribution of light across the object, and avoids a slight image distortion presented in the earlier design by the need for slanting the image plane to prevent reflection of lamp images to the film.

2. Lamps and batteries in the new design are readily replaced by the user in the field, in contrast to a somewhat difficult and time-consuming procedure required to replace these components on the earlier design.

3. Production and assembly cost of the new camera is reduced by eliminating condenser lenses in the illumination system, and by the use of simple molded parts which do not require alignment by skilled optical workers. Substitution of light guide 98 for the condenser lens of the earlier design also permits the viewing extension to be more compact, thereby allowing improved viewing of molar teeth at the rear ends of the dental arch being photographed.

4. Improved circuitry reduces complexity of components controlling motor reversing, and provides automatic cutoff of the camera lamps to prevent excessive battery drain and shortened lamp life which could occur in the earlier design if the operate switch was maintained in a depressed position after completion of the exposure scan. Provision is also made for switch selection of alternative illumination levels and scan rates to permit simple, interchangeable use of films having two different emulsion speeds.

5. A ball-bearing suspension for the scanning assembly insures smooth action of the camera moving parts with minimum frictional drag, and simplifies the camera assembly procedure.

6. The sequencing shaft insures positive shutter operation at the beginning of each exposure scan, and further insures positive shutter closure before the start of each return scan of the scanning assembly.

These features all contribute to a significant improvement in the earlier design, and to a scanning camera which is capable of producing high quality photographs of objects which can only be periscopically viewed.

What is claimed is:

1. A scanning camera for periscopic photography of an object, comprising:

a housing having a light-tight section adopted to support a photographic film;

a scanning assembly having an exposure portion within the light-tight section and a viewing portion external to the light-tight section, the scanning assembly being movably mounted on the housing so the exposure portion can be scanned over the film and the viewing portion can be scanned over the object; the scanning assembly having an optical means including first and second reflecting means mounted adjacent the viewing and exposure portions respectively for reflecting an image of the object to the film through an image path in the camera; the scanning assembly further comprising an elongated panel of light-conducting material, the panel having a cavity spaced from the viewing portion toward the exposure portion, a base releasably secured to the panel over the cavity, and a lamp secured to the base and extending into the cavity, the panel further having a third reflecting means adjacent the viewing portion for reflecting light from the lamp toward the object, the third reflecting means being spaced from the first and second reflecting means so light illuminating the object traverses a path which is separate from the image path; and drive means carried by the housing for driving the scanning assembly across the object and film.

2. The camera defined in claim 1 in which the elongated panel has a reflective beveled end remote from the cavity and forming the third reflective means.

3. The camera defined in claim 2 and further comprising a plurality of lamps secured to the light-source base and arranged in a generally linear array extending across the cavity substantially perpendicularly to a direction of scanning motion of the scanning assembly whereby the object is uniformly illuminated during scanning.

4. The camera defined in claim 3 in which the light-source base includes conductive members electrically connected to the lamps, the light-conducting panel further having a pair of clips mounted adjacent the cavity for releasable engagement with the conductive members to retain the base and make connection with lamps; and further comprising a circuit means carried by the housing and including a battery coupled to the clips for driving the lamps.

5. The camera defined in claim 4 wherein the housing includes a door providing access to the light-tight section, the light-source base and lamps being accessible within the light-tight section and removable from the light-conducting panel as a modular assembly.

6. The camera defined in claim 5 in which the first and second reflecting means are prisms, and the optical means further includes a lens supported on the scanning assembly between the prisms.

7. The camera defined in claim 6 in which the drive means is operative to reciprocate the scanning assembly through an exposure stroke during which the object is illuminated and the film is exposed, and a return stroke which transfers the scanning assembly to a starting position in readiness for another exposure stroke, the circuit means including speed-selection means connected to the drive means for selectively varying scan speed during the exposure scan; and further comprising a shutter mounted on the scanning assembly to be movable between open and closed positions for selectively blocking a light path from the exposure portion to the film druing the return stroke, and sequencing means connected between the drive means and shutter for positively blocking initiation of the exposure scan until the shutter is opened, and for positively blocking initiation of the return scan until the shutter is closed.

8. The camera defined in claim 7 in which the circuit means includes a multicell battery, the circuit means including switching means operative to connect the drive means to different portions of the battery during the exposure and return strokes respectively.

9. A scanning camera for periscopic photography of an object, comprising:
- a housing having a light-tight section adopted to support a photographic film;
- a scanning assembly having an exposure portion within the light-tight section and a viewing portion external to the light-tight section;
- optical means carried by the scanning assembly, and including a lamp for illuminating the object, and an imaging means for conveying light reflected from the object through an imaging path extending from the viewing portion through the scanning assembly and exposure portion toward the film;
- mounting means for supporting the scanning assembly on the frame so the scanning assembly can be reciprocated through an exposure scan and a return scan;
- a shutter supported in the imaging path to be movable between open and closed positions to admit light from the object to the film during the exposure scan, and to block such light from the film during the return scan;
- drive means supported on the camera for reciprocating the scanning assembly; and
- sequencing means connected between the drive means and shutter for controlling shutter position, the sequencing means including first stop means for blocking the exposure scan until the shutter is open, and for blocking the return scan until the shutter is closed, the sequencing means further including a shaft rotatably mounted on the scanning assembly and coupled to the drive means and the shutter, the shaft being arranged to move the shutter between the open and closed positions when it is rotated by the drive means and to move the scanning assembly when rotation is blocked, the shutter including second stop means for blocking shaft rotation when the shutter reaches the open and closed positions.

10. The camera defined in claim 9 in which the mounting means comprises three balls riding on the housing and confined between the scanning assembly and housing to define a planar support for the scanning assembly, two of the balls being on one side of the scanning assembly and the third ball being on the opposite side of the scanning assembly.

11. The camera defined in claim 9 wherein the shaft includes a crank coupled to the shutter for converting shaft rotation to linear shutter motion.

12. The camera defined in claim 9 wherein the first stop means comprises first and second spaced-apart ramps on the hosing, the ramps having abrupt ends, and wherein the shaft includes a lug configured to ride up and drop off the first ramp when the exposure scan is completed, and to ride up and drop off the second ramp when the return scan is completed, the lug and ramp ends cooperating to block further scanning motion of the scanning assembly until the shaft is rotated to actuate the shutter.

13. The camera defined in claim 12 wherein the drive means includes means for rotating the shaft in a first direction which moves the lug clear of the first ramp to permit initiation of the return scan, and in a second opposite direction which moves the lug clear of the second ramp to permit initiation of the exposure scan.

14. The camera defined in claim 13 in which the shaft is mounted on the scanning assembly to have limited axial freedom to ride over the ramps, and further comprising a spring positioned between the scanning assembly and shaft for urging the lug against the ramps.

15. The camera defined in claim 12 in which the drive means includes a reversible motor, a return roller spaced from the motor, and a belt coupled to the motor and extending between the motor and return roller in engagement with the shaft so the belt rotates the shaft during shutter actuation and linearly drives the shaft and scanning assembly when further shaft rotation is blocked by the second stop means; and wherein the drive means includes circuit means having a limit switch for sensing termination of the exposure and return scans, and for reversing the motor at such terminal positions so the lug can be rotated clear of the respective ramp end prior to initiation of the next scan.

16. The camera defined in claim 15 wherein the optical means includes an illumination guide means comprising an elongated panel of a solid light-conducting material, the panel having an enlarged portion defining a cavity, and further having a reflective beveled end remote from the cavity for reflecting light toward the object, and a base releasably secured to the enlarged portion of the panel over the cavity, the lamp being secured to the base and extending into the cavity; and wherein the imaging means comprises first and second spaced-apart reflectors and a lens positioned between the reflectors, the first reflector being positioned at the viewing portion to reflect light from the object toward the lens, the second reflector being positioned at the exposure portion to reflect light from the lens toward the film.

17. The camera defined in claim 16 in which the limit switch of the circuit means is coupled to the lamp to extinguish the lamp automatically at the end of the exposure scan.

18. The camera defined in claim 17 wherein the mounting means includes a three ball planar suspension with two balls confined between one side of the scanning assembly and the housing and a third ball confined between an opposite side of the scanning assembly and housing, and means on the housing for urging the scanning assembly against the balls and confining the scanning assembly to a linear reciprocating motion with respect to the housing.

* * * * *

UNITED STATES PATENT OFFICE
CERTIFICATE OF CORRECTION

Patent No. 3,812,505　　　　　　　Dated May 21, 1974

Inventor(s) James B. Elliott

It is certified that error appears in the above-identified patent and that said Letters Patent are hereby corrected as shown below:

Column 17, claim 7, line 19, "druing" should read -- during --.

Column 18, claim 12, line 13, "hosing" should read -- housing --.

Signed and sealed this 1st day of October 1974.

(SEAL)
Attest:

McCOY M. GIBSON JR.
Attesting Officer

C. MARSHALL DANN
Commissioner of Patents